Figure 1:
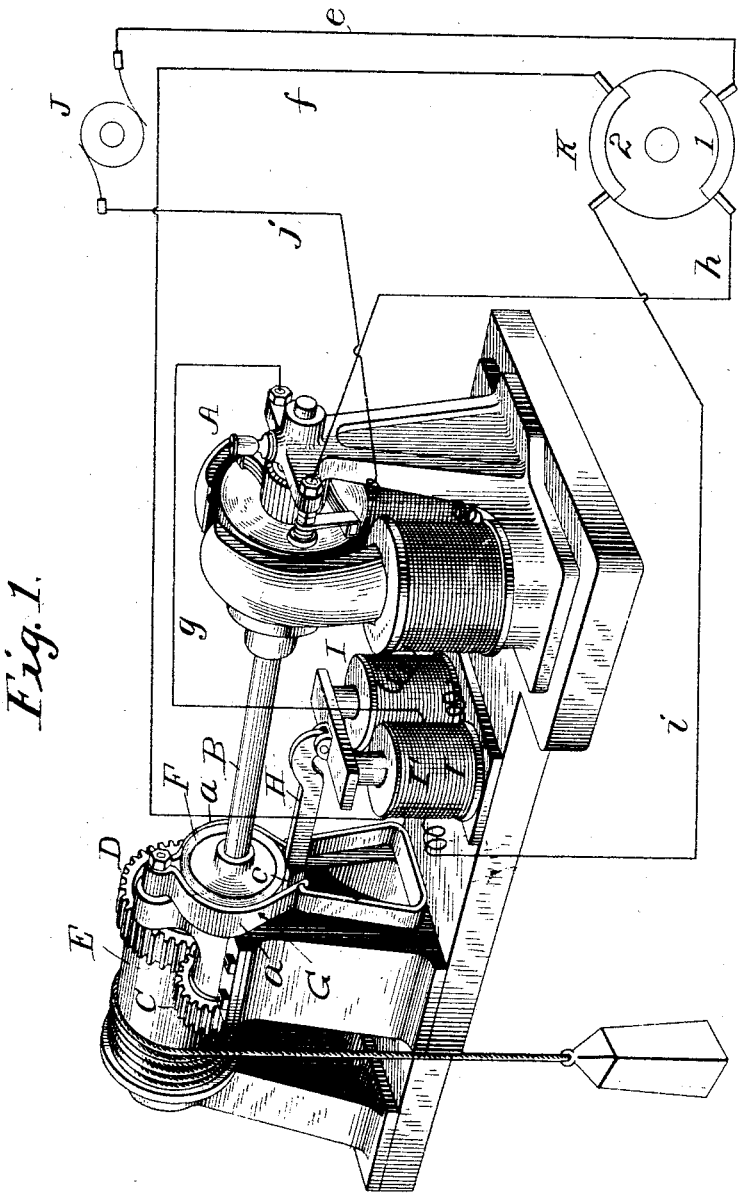

(No Model.)
2 Sheets—Sheet 1.

G. A. BROWN.
ELECTRIC ELEVATOR BRAKE.

No. 515,281. Patented Feb. 20, 1894.

Witnesses
C. C. Burdine
Horace A. Dodge.

George A. Brown,
Inventor
By Dodge & Sons,
Attorneys

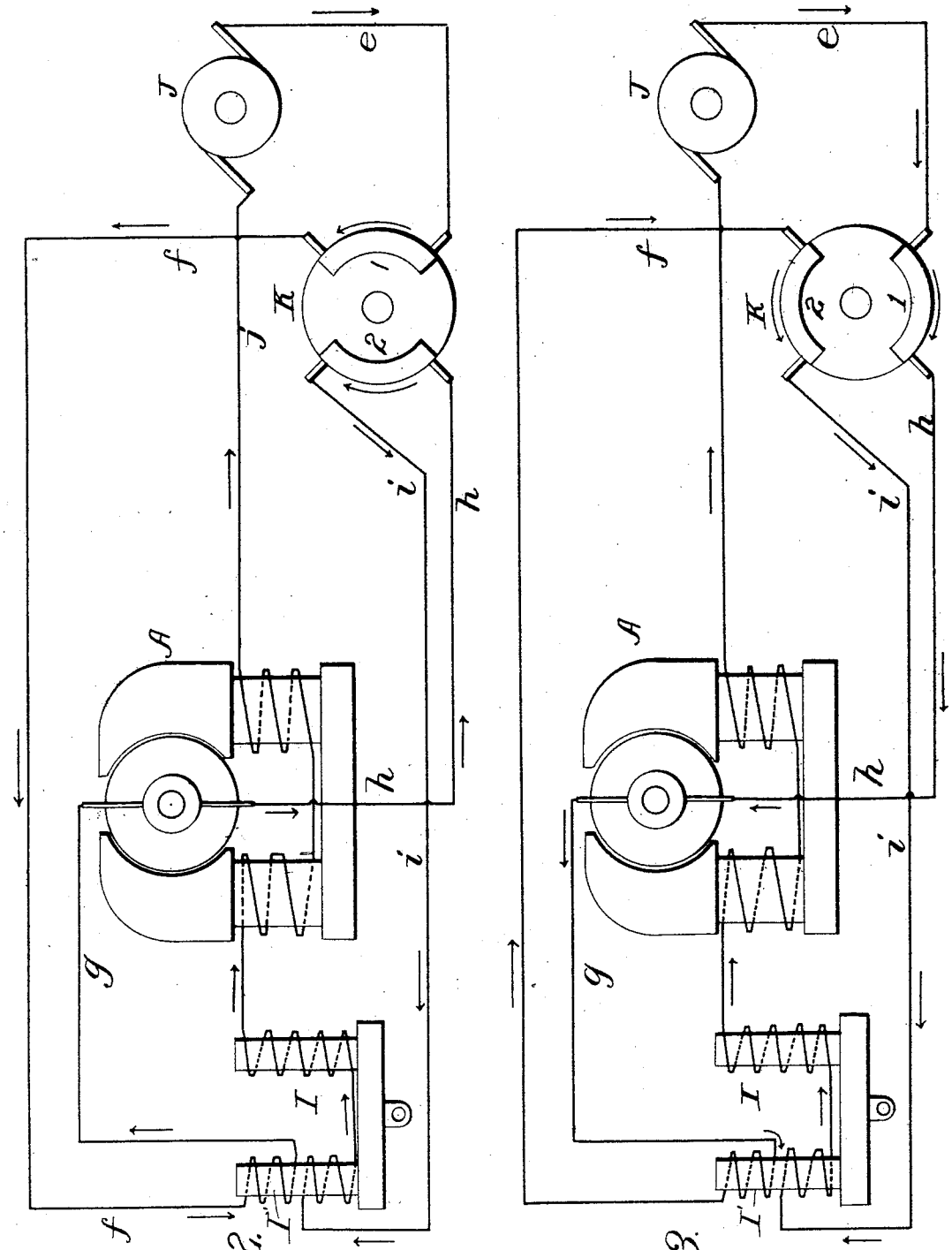

UNITED STATES PATENT OFFICE.

GEORGE A. BROWN, OF MUSKEGON, MICHIGAN.

ELECTRIC ELEVATOR-BRAKE.

SPECIFICATION forming part of Letters Patent No. 515,281, dated February 20, 1894.

Application filed October 13, 1893. Serial No. 488,082. (No model.)

*To all whom it may concern:*

Be it known that I, GEORGE A. BROWN, a citizen of the United States, residing at Muskegon, in the county of Muskegon and State of Michigan, have invented certain new and useful Improvements in Hoisting Machinery, of which the following is a specification.

My invention consists in the combination with an electro-motor, or with such motor and machinery propelled thereby, of a differential magnetic brake, adapted to leave the driven machinery free or unretarded while moving in one direction, and to permit or cause the partial application of the brake while moving in the reverse direction.

Before entering further upon the description of my invention, I desire to state that I am not the originator of the broad idea of combining with an electro-motor, a brake adapted to release the motor or the machinery driven by it when the latter is moving in one direction, and only partially to release it during reverse movement, nor am I the first to employ a differential magnet for effecting such control, as these are the inventions of Alton J. Shaw.

My invention resides in the employment of a differential magnet comprising two coils or sets of coils, one in series with the field and the other in series with the armature, the whole serving automatically to control the brake, and thereby to render the descent of the load regular and constant as to speed.

In the drawings,—Figure 1 is a perspective view of apparatus embodying my invention, it being understood, however, that this is merely illustrative, and subject to wide modification; Figs. 2 and 3, diagrams illustrating the arrangement of circuits and connections involved in carrying out my invention.

As is well understood, in lifting a load, or in propelling a car or vehicle on an upgrade, the work or load is opposed to and tends to retard the motor; while in lowering a load or in descending a grade, the load acts with and tends to aid or turn the motor. It is desirable, therefore, to provide a brake which shall release the propelled machinery or the motor while the load is opposed to it, but which shall retard the motor or the machinery driven by it while the load is descending. This result I attain in an exceedingly satisfactory degree by the arrangement shown in the drawings, wherein I have represented a very simple type of hoist, and have illustrated one of many forms of motor, brake, and switch adapted to carry out the invention.

Referring to said drawings, A indicates an electro-motor of that class in which the field current is of constant direction, and the armature current is reversible to permit reversal of direction of rotation of the armature.

B indicates the motor shaft or arbor, or it may be a separate shaft geared or connected therewith in any usual or convenient way, and provided with a pinion C, which, gearing with a larger wheel D, gives motion to a chain barrel or hoisting drum E. It will of course be understood that this intermediate connection between the drum and motor is merely illustrative, and subject to change as desired.

F indicates a disk or hub formed or secured upon shaft B, or upon any member of the train employed, and G indicates a brake arranged to press upon said disk with force sufficient to hold it, and consequently its shaft, against rotation, even with the full load acting to turn it. The brake here represented is of the form and construction set forth in Letters Patent of the United States, granted to A. J. Shaw, respectively dated and numbered, May 19, 1891, No. 452,619, and October 13, 1891, No. 461,052. It consists of two curved or semicircular shoes *a, a,* suspended from a pivot directly over the disk F, the free or lower ends of said shoes being forced toward the disk F by a powerful spring *b*. When not thrown apart by special means, these shoes clasp the disk F and hold the mechanism firmly against rotation; but so long as the motor is in operation, they are forced apart and their pressure is either partially or wholly withdrawn from the disk by the mechanism shown in Fig. 1. This consists of a lever H, bearing a wedge block *c*, at a point between the shoes *a, a,* and carrying at one end the armature or the movable core of an electro-magnet, according to the style of magnet employed.

The drawings represent an electro-magnet I, consisting of two solenoid coils, the movable cores $d$ of which are carried by one end of lever H, the opposite end of which is preferably counterweighted and somewhat overbalanced so as to lift the wedge from between the brake shoes when the magnet is de-energized. As stated, the field current of the motor is of constant direction while the current is reversible through the armature to cause the motor to run in one or the other direction as required to raise or to lower the load. Now, by including one portion of the brake-magnet coils in series with the armature, I cause a reversal of the current therein simultaneously with and by reason of reversal of the armature current; but the remaining coils of the brake-magnet being in series with the field magnets of the motor, the current through them is always in one direction. From this it follows that when the motor turns in one direction, that in which the load is opposed to it, the entire winding of the brake-magnet is traversed by a current of one direction, and this the direction necessary to cause the magnet cores to be drawn into the coils. This in turn causes the brake-lever H to descend, carrying the wedge block between the brake shoes, and entirely withdrawing the brake pressure. When, however, the current is reversed through the armature, it is likewise reversed in that portion of the brake-magnet winding in series with the armature, and consequently the coils so included act in opposition to the remaining coils of the magnet, partially neutralizing the latter. In this way there is produced a magnet which exerts its maximum force during the lifting of a load, but which becomes a differential magnet when the motor is reversed, the magnet then having a strength corresponding to the preponderance of one portion of the winding over the other.

The relative proportion may be varied as required, either in the original construction of the apparatus or by variable or shifting connections, and may be employed with single or plural coils, and in the latter case confined to one, or extended to the several coils.

Referring now to Fig. 2, I will trace the circuit and connections as arranged for hoisting, first observing that J indicates an electric generator, battery or other source of electric energy, and K a reversing switch with two insulated conducting strips or sections 1 and 2. Starting from the supply source J the current proceeds by conductor $e$ to conducting section No. 1 of the switch K, thence by conductor $f$ to the reversible or neutralizing coil I' of magnet I, thence to the upper commutator brush of the motor A and through the armature to the lower brush, thence by conductor $h$ to section 2 of the switch K, thence by conductor $i$ to the main or constant coils of magnet I, thence to the field coils of the motor A, and finally, by conductor $j$ back to the source or generator J. Under this arrangement the current traverses the main and reversible or neutralizing coils of the brake magnet in the same direction, hence both sets of coils act in unison and give the magnet the full power due to given current, thereby completely withdrawing the brake.

Referring now to Fig. 3 which represents the lowering adjustment, the current passes from the generator or source of energy J, by conductor $e$ to section No. 1 of the switch K, thence by conductor $h$ to the lower brush of the motor A, through the armature coils to the upper brush, thence by conductor $g$ to the neutralizing coil I' of brake magnet I, thence by conductor $f$ to section 2 of the switch K, thence by conductor $i$ to the main or constant coils of brake magnet I, thence to the motor field coils, and finally back to the generator or source J by the conductor $j$. It will be seen that under this adjustment the current traverses the neutralizing coils I' of brake magnet coil I in the reverse direction from that explained in connection with Fig. 2, and consequently in a direction opposite to the travel of the current through the main coils, which remains unchanged in direction. The coils I' therefore neutralize a like number of the remaining or constant coils of brake magnet I, thereby weakening said magnet and permitting the lever H to rise somewhat and to permit the brake shoes to be applied with limited but sufficient force to regulate the descent of the load.

It is obvious that any suitable reversing motor may be employed, and that instead of reversing the armature current, the field current could be reversed, the neutralizing coil being of course in the reversible branch. So too, the switch and other parts, as well as the hoisting or driven mechanism, may vary at will.

I prefer to employ one or more solenoid magnets for controlling the brake, as indicated in the drawings, the core or cores in such case being preferably of soft iron, since the counterweight effects withdrawal of the armature; but I may use an electro-magnet with fixed cores and with a soft iron armature, if deemed desirable, or a solenoid with polarized core. Complete interruption of the circuit of course permits the brake to go into action with full power and effect.

While a single switch is preferred to reverse both the armature current and that of the neutralizing coil, separate switches may obviously be employed.

The apparatus is automatic in operation, and causes the load, whether heavy or light, to descend at a constant and predetermined speed. The reason of this may be stated thus: The load descends at a speed dependent upon, first, the weight of the load; and second, the power applied to or through the armature, both of which tend to lower the load, which tendency is resisted by the pressure of the brake, as controlled by the solenoid or brake-magnet. As the speed of descent increases, a counter electro-motive force is set up, which lessens the flow of current through the circuit, and this decrease of current causes the weakening or partial de-energization of the solenoid or brake magnet, which weakening permits the brake to exert a greater pressure upon the brake hub or disk. Increase of brake pressure of course retards descent of the load and lowers the speed of the motor, whereupon counter electro-motive force is lessened or suppressed, and the action above stated is reversed. The several conditions or effects above stated occur at so nearly the same instant that the interval between them is inappreciable, and there is no observable variation in the speed of descent after the predetermined rate is reached.

Having thus described my invention, what I claim is—

1. In combination with an electro-motor, a brake, an electro-magnet for controlling the brake, said magnet having independent coils or windings, one in series with the armature of the motor and means substantially as described for reversing the motor and for reversing the current in a portion of the brake-magnet coils, while leaving it unchanged as to direction in the remaining coils thereof.

2. In combination with a source of electric energy, an electro-motor, a brake, an electro-magnet for controlling said brake, said magnet having independent coils or windings, one in series with the motor armature and a switch adapted to reverse the motor and simultaneously to reverse the current through a portion of the brake-magnet coils; whereby the brake magnet is strongly energized while the load is acting in opposition to the motor, and is less strongly energized when the load is acting with the motor.

3. In combination with a reversible electro-motor, as A, and a source of electric energy as J, a brake, as G, adapted to retard the motor, a differential magnet as I I', for controlling said brake having one winding in series with the motor armature, and a switch as K, adapted to reverse the armature current and to reverse the current through a portion of the winding of the brake-controlling magnet.

4. The herein described method of controlling electrically propelled machinery, having a brake and a differential magnet for controlling said brake, which consists in passing the reversible current of the motor through one winding of the brake-magnet and through the armature of the motor in series.

5. The herein described method of controlling electrically propelled machinery, which consists in passing the current in series through the field winding of the motor and through a portion of the brake magnet-winding constantly in one direction,—and in series through the armature winding and through the remaining portion of the brake-magnet winding alternately in reverse directions as the load operates in opposition to or in aid of the motor; whereby the brake is fully withdrawn when the load is opposed to the motor, and is withdrawn less or more when the load acts with the motor, according to the rate of descent.

In witness whereof I hereunto set my hand in the presence of two witnesses.

GEORGE A. BROWN.

Witnesses:
CLAUDE BEARDSLEY,
R. A. FLEMING.